United States Patent
Van Der Sluis

(10) Patent No.: US 10,274,082 B2
(45) Date of Patent: Apr. 30, 2019

(54) HYDRAULICALLY ACTUATED CONTINUOUSLY VARIABLE TRANSMISSION FOR A VEHICULAR DRIVE LINE PROVIDED WITH AN INTERNAL COMBUSTION ENGINE

(71) Applicant: ROBERT BOSCH GMBH, Stuttgart (DE)

(72) Inventor: Francis Maria Antonius Van Der Sluis, Sint-Michielsgestel (NL)

(73) Assignee: ROBERT BOSCH GMBH, Stuttgart (DE)

( * ) Notice: Subject to any disclaimer, the term of this patent is extended or adjusted under 35 U.S.C. 154(b) by 459 days.

(21) Appl. No.: 14/650,480

(22) PCT Filed: Dec. 6, 2013

(86) PCT No.: PCT/EP2013/075787
§ 371 (c)(1),
(2) Date: Jun. 8, 2015

(87) PCT Pub. No.: WO2014/086968
PCT Pub. Date: Jun. 12, 2014

(65) Prior Publication Data
US 2015/0308570 A1    Oct. 29, 2015

(30) Foreign Application Priority Data

Dec. 6, 2012   (NL) ..................................... 1039930

(51) Int. Cl.
*F16H 61/00*   (2006.01)
*F16H 61/662*  (2006.01)
*F16H 61/02*   (2006.01)

(52) U.S. Cl.
CPC ... *F16H 61/66272* (2013.01); *F16H 61/0031* (2013.01); *F16H 61/0206* (2013.01)

(58) Field of Classification Search
CPC .......... F16H 61/66272; F16H 61/0031; F16H 61/0206; F16H 61/0021; F16H 61/0025
(Continued)

(56) References Cited

U.S. PATENT DOCUMENTS 5,168,975 A    12/1992  Berhardt et al.
6,196,806 B1 *  3/2001  Van Der Sluis ............................
                                                F16H 61/66272
                                                417/295
(Continued)

FOREIGN PATENT DOCUMENTS

DE          4 134 26 A1    4/1992
EP          0 826 910 A1   3/1998
WO       2006/016797 A1    2/2006

OTHER PUBLICATIONS

International Search Report, dated Mar. 6, 2014, from corresponding PCT application.

*Primary Examiner* — F Daniel Lopez
*Assistant Examiner* — Dustin T Nguyen
(74) *Attorney, Agent, or Firm* — Young & Thompson

(57) ABSTRACT

A hydraulically actuated continuously variable transmission (1) is provided with a hydraulic system (TH) for the control of the torque transmissible by the transmission (1) as well as the speed ratio provided by the transmission (1). The hydraulic system (TH) is provided with a mechanically driven hydraulic pump (PM) and with an electrically driven hydraulic pump (PE) for generating a pressurised flow of hydraulic medium for the actuation of the transmission. The electrically driven pump (PE) can be switched either downstream of or in parallel with the mechanically driven pump (PM).

8 Claims, 1 Drawing Sheet

(58) Field of Classification Search
USPC ............ 60/486, 468, 487, 488, 489; 477/45; 474/28
See application file for complete search history.

(56) References Cited

U.S. PATENT DOCUMENTS

2008/0308355 A1* 12/2008 Kakinami ............... F16H 57/04
　　　　　　　　　　　　　　　　　　　　　　　　　　184/27.2
2011/0301793 A1　　12/2011　Hsieh et al.

\* cited by examiner

HYDRAULICALLY ACTUATED CONTINUOUSLY VARIABLE TRANSMISSION FOR A VEHICULAR DRIVE LINE PROVIDED WITH AN INTERNAL COMBUSTION ENGINE

BACKGROUND OF THE INVENTION

Field of the Invention

The present invention relates to a continuously variable transmission.

Description of the Related Art

Such a continuously variable transmission is generally known, and e.g. described in the international patent publication WO-A-2006/016797 in the name of Applicant. The known continuously variable transmission, which may be one of several known types, provides a speed ratio that may be controlled to an arbitrary value within a range of speed ratios covered by the transmission by an appropriate actuation thereof. In addition to such speed ratio control, the actuation of the transmission further includes the control of a transmissible torque of the transmission. Typically, such transmission ratio and torque control requires a relatively large flow of hydraulic fluid at a relatively high pressure level. Although such a high pressure level per se may be realised and controlled without extraordinary difficulty in the known transmission, it is particularly the large flow of fluid at such high pressure level that is required for dynamic operation of the transmission, i.e. for changing its speed ratio, that poses a significant strain to the lay-out and/or components of the hydraulic system of the transmission. Such strain is all the more felt where a hydraulic pump of the transmission is driven mechanically, i.e. directly by an internal combustion engine of a vehicular drive line in which the transmission is applied.

In the above-mentioned international publication it is therefore proposed to alleviate such strain by providing the transmission not only with a mechanically driven pump, but also with an electrically driven pump, e.g. driven by an electric motor that is supplied with power by the battery or generator/alternator of the vehicle in which the transmission is applied, which latter, electrically driven pump is incorporated downstream of the mechanically driven pump, i.e. which latter pump is supplied with fluid by the mechanically driven pump. In this known arrangement the so-called auxiliary hydraulic functions of the transmission, such as clutch pressurisation and lubrication of moving parts, are supplied with fluid by the mechanically driven pump, whereas its main hydraulic function, i.e. the said transmission ratio and torque control, is supplied with fluid also via the electrically driven pump. This known arrangement was found to provide a comparatively energy efficient and silent electro-hydraulic control system for a continuously variable transmission.

When the known transmission is applied in a vehicular drive line it comes with the limitation that the electrically driven pump has to be constantly operational and, moreover, has to be capable of providing the entire fluid flow that is required for main hydraulic function of the transmission. According to the present invention, the known transmission can be significantly improved upon. By such measure, i.e. by being able to selectively switch the electrically driven pump either downstream of, or in parallel with the mechanically driven pump the functionality and the overall efficiency of the transmission is improved relative to known transmission of WO-A-2006/016797. More in particular the transmission according to the invention adds two further hydraulic modes to the two known hydraulic modes provided by the known transmission.

BRIEF SUMMARY OF THE INVENTION

Firstly, the transmission according to the invention provides that the electrically driven pump can be supported by the mechanically driven pump in providing a flow of fluid required for the main hydraulic function of the transmission by switching both pumps in parallel. Instead, in the known transmission the entire flow of fluid that is required for such main hydraulic function passes through, i.e. is pumped by the electrically driven pump. This means that the specifications of the electrically driven pump (e.g. in terms of its drive motor, stroke volume, pump speed etc.) are determined by the substantial flow and pressure requirements of the main hydraulic function during dynamic operation of the transmission. By being able to switch the mechanically driven pump in parallel with the electrically driven pump, at least during such "dynamic operation" hydraulic mode of the transmission, the said required specifications of the electrically driven pump are alleviated and, as a result, the overall cost of the transmission is reduced.

Secondly, the transmission according to the invention provides that, if the electrically driven pump fails, the vehicle can be continued to be used/operated. Such a failure of the electrically driven pump can, for instance, occur when insufficient electric power is available for the required operation of the electrically driven pump. In such "electric-pump-failure" hydraulic mode of the transmission, the electrically driven pump is again switched in parallel with the mechanically drive pump such that the mechanically driven pump provides the hydraulic fluid that is required for the said main hydraulic function of the transmission.

Also the German patent application DE-A-41 34 268 describes a continuously variable transmission with an electro-hydraulic control system that is capable of the actuation of the transmission when the engine is stopped. However, this latter transmission system has neither the capabilities, nor the advantages of the transmission according to the present invention. For example, this known transmission system lacks the energy efficient option to switch the electrically driven pump downstream, in series with the mechanically driven pump.

In a further development of the invention, a one-way or check valve is provided at the discharge port or outlet of the mechanically driven pump and/or the electrically driven pump, to favourably prevent that, when a respective pump is not in operation, no fluid can leak towards the suction port or inlet of such pump, i.e. back to the fluid reservoir.

In yet a further development of the invention, the mechanical driven pump is provided as variable flow pump that generates a flow of fluid that can be varied between zero and a certain maximum that depends on the speed of the engine driving the pump. In this manner, a very adaptive and responsive hydraulic system is obtained that can not only be operated in the said four different hydraulic modes, but wherein in each one of such four hydraulic modes, the flow of fluid generated by the then operational pump or pumps can be adapted to the fluid flow requirement of the transmission.

BRIEF DESCRIPTION OF THE DRAWINGS

The invention will now be elucidated further along a drawing in which.

DETAILED DESCRIPTION OF THE PREFERRED EMBODIMENTS

In the figures, identical references relate to corresponding technical functions or structures, as the case may be. The thick lines indicate hydraulic lines, i.e. passages for hydraulic fluid, whereas the dashed lines indicate pressure control lines for the control, i.e. the biasing of the various hydraulic valves.

Figure 1:
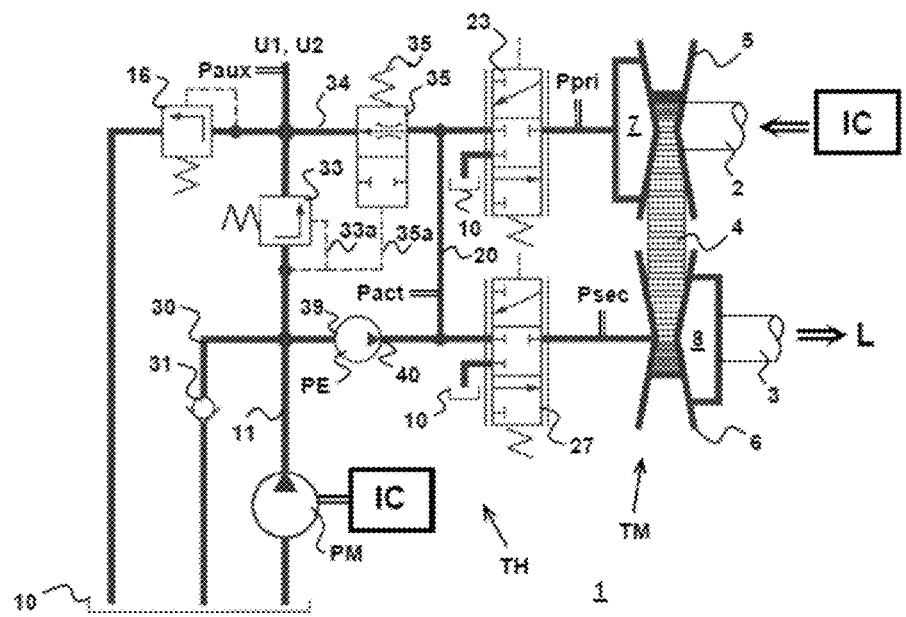
FIG. 1 is a schematic representation of a prior art and to be improved continuously variable transmission.

FIG. 1 schematically shows the known continuously variable transmission 1 comprising a mechanical system TM, for realising and changing a speed ratio between an input shaft 2 and an output shaft 3 of the transmission 1, and a hydraulic system TH for the operation and control of the transmission 1. The hydraulic system TH is arranged both for the actuation of the said mechanical system TM and for the control of all auxiliary hydraulic users U1, U2 of the transmission 1, such as clutch pressurisation and lubrication of moving parts. The transmission 1 may be incorporated between an internal combustion engine IC and a load L, for example in a motor vehicle drive line, for varying a speed ratio between the engine IC and the load L within a continuous range of possible speed ratios.

In this particular example the mechanical system TM of the known transmission 1 comprises an endless flexible belt 4 that is wrapped around two pulleys 5 and 6, whereby each pulley is connected to either the input shaft 2 or the output or secondary shaft 3 of the transmission 1. The belt 4 is frictionally engaged with the pulley discs of a respective pulley 5, 6 by means of a clamping force that is generated by a hydraulic pressures in a pressure chamber 7, resp. 8 of a piston-and-cylinder assembly that is associated with that respective pulley 5, 6, i.e. either the so-called primary pressure chamber 7 associated with the pulley 5 connected to the input shaft 2, or the so-called secondary pressure chamber 8 associated with the pulley 6 connected to the input shaft 3.

The hydraulic system TH of the known transmission 1 comprises a mechanically driven main pump PM and an electrically driven auxiliary pump PE, which latter pump PE may be activated on demand and to a variable extent, in particular during dynamic operation of the mechanical system TM of the transmission 1. The mechanically driven pump PM on the other hand is driven directly and continuously by the engine IC, the flow of fluid supplied thereby thus being dependent on the rotational speed of the drive shaft of the engine IC.

The mechanically driven pump PM draws fluid in via its inlet or suction port from a reservoir 10 for hydraulic fluid. This fluid is supplied via the outlet or discharge port of the pump PM to a distribution line 11 of the hydraulic system TH. The electrically driven pump PE is provided downstream of the mechanically driven pump PM, such that it draws fluid from the distribution line 11 via its inlet 39 and supplies it to a main actuation line 20 of the hydraulic system TH for controlling a primary pressure Ppri in the primary pressure chamber 7 and a secondary pressure Psec in the secondary pressure chamber 8 of the transmission 1. To this end, by way of example, the main actuation line 20 connects to both a primary valve 23, which is located between the electrically driven pump PE and the primary pressure chamber 7 for controlling the primary pressure Ppri to a desired level, and a secondary valve 27, which is located between the electrically driven pump PE and the secondary pressure chamber 8 for controlling the secondary pressure Psec to a desired level. Both said valves 23 and 27 are operated under the influence of generally known valve biasing means that, typically, comprise respective valve-control conduits and springs. Hereby, a valve-control pressure, exerted in a respective valve-control conduit for operating a respective valve 23, 27, is realised by means of a respective solenoid-operated additional valve (not shown). By means of the primary and secondary valves 23 and 27, the respective pressure level Ppri, Psec can be controlled between ambient pressure, i.e. the pressure level prevailing in the fluid reservoir 10, and a main actuation pressure level Pact prevailing in the main actuation line 20, which main actuation pressure Pact is effected by the appropriate, i.e. by a controlled operation of the electrically driven pump PE. Alternatively, for example for improving the accuracy and/or responsiveness of the main actuation pressure Pact, it is possible to include an actuation pressure-regulating valve in the hydraulic system TH.

The auxiliary hydraulic users U1, U2 of the transmission 1 can be connected to the distribution line 11 via further pressure-regulating valve 33, such that these auxiliary hydraulic users U1, U2 are supplied with fluid from the distribution line 11, at least when the mechanically driven pump PM is running and the pressure level in the distribution line 11 can be maintained at the desired auxiliary pressure level Paux by means of an auxiliary pressure-regulating valve 16 of the hydraulic system TH.

Further in the present example of the hydraulic system TH, any surplus of the flow of fluid generated by the mechanically driven pump PM is returned by the auxiliary pressure-regulating valve 16 to the fluid reservoir 10. It is, however, common practice to direct the said flow surplus to one or more moving parts of the transmission 1 for the lubrication and/or cooling thereof.

To allow the continued operation of the known transmission 1 even when the mechanically driven pump PM is stopped—which inter alia occurs when the vehicle engine IC is stopped during continued operation of the drive line, e.g. in order to save fuel when the vehicle is at rest or during electric drive of the vehicle in a hybrid drive line—the hydraulic system TH is provided with yet a further hydraulic line 30, denoted supply line 30 hereinafter. This supply line 30 is provided between and connects the distribution line 11 and the fluid reservoir 10 and allows the electrically driven pump PE to draw fluid directly from the reservoir 10, bypassing the mechanically driven pump PM when this latter pump PM is stopped. A one-way or check valve 31 is provided in the supply line 30 to prevent that fluid flows from the distribution line 11 directly (back) to the reservoir 10 when the mechanically driven pump PM is running, i.e. is pumping fluid from the reservoir into the distribution line 11.

Further to allow the continued operation of the known transmission 1, the further pressure control valve 33 is arranged to close the (direct) hydraulic connection between the distribution line 11 and the auxiliary hydraulic users U1, U2, at least when the mechanically driven pump PM is stopped, to prevent that the electrically driven pump PE draws fluid from the auxiliary hydraulic users U1, U2. To still supply the auxiliary hydraulic users U1, U2 with fluid when the mechanically driven pump PM is stopped, the hydraulic system TH of the known transmission 1 is provided with yet a further hydraulic line 34, denoted the connecting line 34, which is provided between and connects the outlet 40 of the electrically driven pump PE and the auxiliary hydraulic users U1, U2 and which is interrupted by a switch valve 35. The switch valve 35 is arranged and operated ("switched"), by means of valve biasing means comprising a respective valve-control conduit 35*a*, carrying the pressure in the distribution line 11, and a spring 35*b*, to connect the outlet 40 of the electrically driven pump PE to the auxiliary hydraulic users U1, U2 when the pressure level in the distribution line 11 cannot be maintained at the (desired) auxiliary pressure Paux. This condition for example occurs when the mechanically driven pump PM is stopped. The switch valve 35 thus provides that the auxiliary hydraulic functions U1, U2 of the transmission 1 can be continued to be supplied with hydraulic fluid, even when the mechanically driven pump PM is stopped and/or when the pressure control valve 33 is closed.

Figure 2:
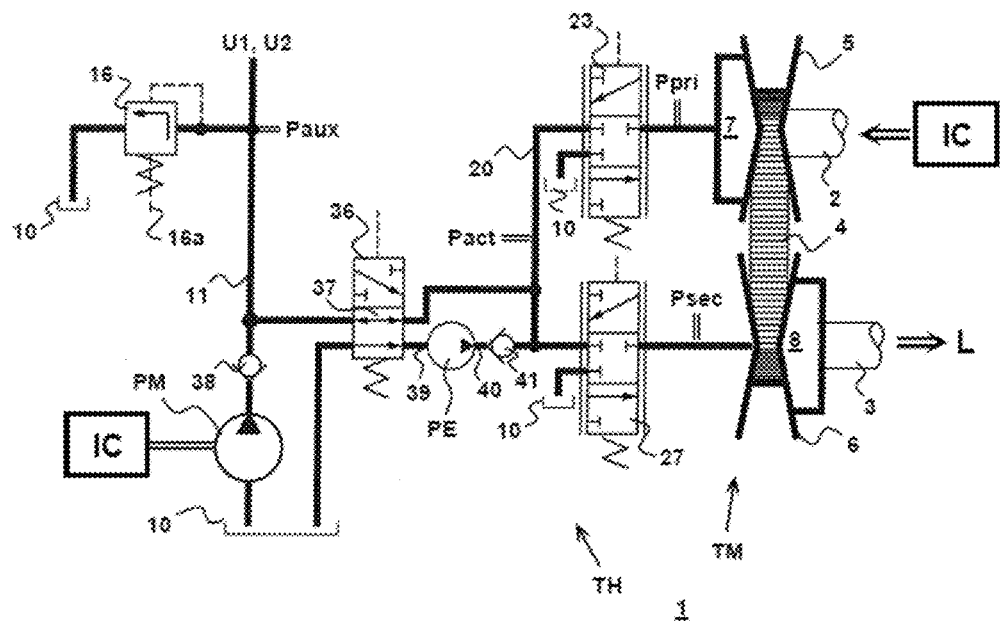
FIG. 2 represents the hydraulic configuration of the novel transmission according to the invention.

According to the present invention the above known transmission 1 can be significantly improved by applying therein the hydraulic system TH of FIG. 2. In particular, in the improved hydraulic system TH of FIG. 2 the further pressure control valve 33 and the switch valve 35 of the known hydraulic system TH of FIG. 1, at least the hydraulic functions provided by these two valves 33, 35, have been replaced by a single switch valve 36, denoted hydraulic-mode switch valve 36 hereinafter. In accordance with the invention, the hydraulic-mode shift valve 36 is arranged to switch the electrically driven pump PE either in parallel with the mechanically driven pump PM while opening a (direct) hydraulic connection 37 between the main actuation line 20 and the distribution line 11, or in series with the mechanically driven pump PM while closing the said hydraulic connection 37 between the main actuation line 20 and the distribution line 11. By this feature, i.e. by the thus arranged hydraulic-mode shift valve 36 in the hydraulic system TH, the transmission 1 can favourably be operated in one or more of four different hydraulic modes.

In a first hydraulic mode, the hydraulic-mode shift valve 36 is in the position depicted in FIG. 2, wherein the electrically driven pump PE is switched in parallel with the mechanically driven pump PM and the hydraulic connection 37 between the main actuation line 20 and the distribution line 11 is opened. Further in this first hydraulic mode both said pumps PE, PM are operational, such that the electrically driven pump PE is supported by the mechanically driven pump PM. This first hydraulic mode favourably allows the electrically driven pump PE and/or the mechanically driven pump PM to be smaller as compared to the prior art, such that it can be manufactured and/or operated more economically. This first hydraulic mode is particularly useful and will normally be activated when the said transmission ratio and torque control demands a relatively large flow of hydraulic fluid, such as during an emergency stop of the vehicle.

In a second hydraulic mode, the hydraulic-mode shift valve 36 is likewise in the position depicted in FIG. 2, wherein the electrically driven pump PE is switched in parallel with the mechanically driven pump PM and the hydraulic connection 37 between the main actuation line 20 and the distribution line 11 is opened. However, in this second hydraulic mode only the mechanically driven pump PM is operational, whereas the electrically drive pump PE is not operational, for example due to electric or mechanical failure of the pump system. In this second operational mode, the mechanically driven pump PM takes over the function of the electrically driven pump PE in full and thus favourably provides a back-up thereto. A one-way or check valve 41 can be provided at the outlet 40 of the electrically driven pump PE, to favourably prevent that fluid leaks from the main actuation line 20 to the fluid reservoir 10 via this pump PE when it is not in operation.

In a third hydraulic mode, the hydraulic-mode shift valve 36 is likewise in the position depicted in FIG. 2, wherein the electrically driven pump PE is switched in parallel with the mechanically driven pump PM and the hydraulic connection 37 between the main actuation line 20 and the distribution line 11 is opened. However, in this third hydraulic mode only the electrically drive pump PE is operational, whereas mechanically driven pump PM is not operational, i.e. is not being driven by the vehicle engine IC. In this third operational mode, the electrically driven pump PE takes over the function of the mechanically driven pump PM in full and thus favourably allows the vehicle engine IC to be stopped to save fuel, whereas the transmission 1 remains functional. As an optional feature, a one-way or check valve 38 is provided at the discharge port or outlet of the mechanically driven pump PM, to favourably prevent that fluid leaks from the distribution line 11 to the fluid reservoir 10 via such respective pump PM.

It is noted that in the above-described first, second and third hydraulic modes of the transmission 1 according to the invention, at least in the particular embodiment thereof that is shown in FIG. 2, the auxiliary pressure-regulating valve 16 effectively determines, at least influences, the main actuation pressure Pact, because of the hydraulic connection 37 between the main actuation line 20 and the distribution line 11 by the hydraulic-mode shift valve 36. Thus, to allow the main actuation pressure Pact to be controlled to the desired level that is typically higher than the desired level for the auxiliary pressure Paux, this latter auxiliary pressure Paux is temporarily, i.e. during the activation of the said first hydraulic mode, allowed to exceed the said desired level thereof and, more in particular, is made to coincide with the said desired level for the main actuation pressure Pact. This particular control behaviour can be realised by (temporarily) using the auxiliary pressure-regulating valve 16 to control the main actuation pressure Pact to the said desired level thereof. Alternatively, it is possible to fully close the auxiliary pressure-regulating valve 16 and to (continue to) control the main actuation pressure Pact in the normal manner described hereinabove with reference to FIG. 1. In both such realizations, the auxiliary pressure-regulating valve 16 must be actively controllable, for example by incorporating the valve 16 with a hydraulic valve control line 16*a*, as is schematically indicated in FIG. 2.

In a fourth hydraulic mode, the hydraulic-mode shift valve 36 is switched from the position depicted in FIG. 2 into a position providing the said series connection between the electrically driven pump PE and the mechanically driven pump PM while closing the said hydraulic connection 37 between the main actuation line 20 and the distribution line 11. This fourth hydraulic mode provides a comparatively energy efficient and silent operation of the transmission 1, in particular during steady state operation thereof, as occurs frequently during the typical use of any vehicle.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible that to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. A continuously variable transmission configured to transmit a drive power between an engine and a load at a variable transmission ratio, the transmission comprising:
   a hydraulic system for the control of a hydraulic pressure in at least two parts of the hydraulic system that is an actuation pressure in a main actuation line and an auxiliary pressure in a distribution line, comprising
      a first pump that is mechanically driven by the engine to pump hydraulic fluid from a reservoir to auxiliary hydraulic users via the distribution line,
      a second pump that is electrically driven to pump hydraulic fluid from an inlet thereof to the main actuation line,
      a switch valve configured to selectively provide a first hydraulic connection between the inlet of the electrically driven pump and the distribution line and a second hydraulic connection between the inlet of the electrically driven pump and the reservoir, to provide a main hydraulic connection between the main actuation line and the distribution line, when the inlet of the electrically driven pump is connected to the reservoir by the switch valve, and to close the main hydraulic connection between the main actuation line and the distribution line, when the inlet of the electrically driven pump is connected to the distribution line by the switch valve, and
      a one-way valve provided between the mechanically driven pump and the distribution line,
   wherein the one or more auxiliary hydraulic users are supplied with the hydraulic fluid, provided by the auxiliary pressure, directly from the distribution line, and when the inlet of the electrically driven pump is connected to the reservoir by the switch valve via the second hydraulic connection, the auxiliary hydraulic users are supplied with the hydraulic fluid from the distribution line via the main hydraulic connection.

2. The continuously variable transmission according to claim 1, further comprising a one-way valve provided between the electrically driven pump and the main actuation line.

3. The continuously variable transmission according to claim 1, further comprising a drive belt, and at least one adjustable pulley with a pressure chamber that is supplied with hydraulic fluid out of the main actuation line.

4. The continuously variable transmission according to claim 3, wherein the transmission is provided with the one or more auxiliary hydraulic users supplied with the hydraulic fluid out of the distribution line.

5. The continuously variable transmission according to claim 4, wherein the one or more auxiliary hydraulic users comprise one of a clutch and a lubrication system.

6. The continuously variable transmission according to claim 1, wherein the transmission is provided with a pressure control system configured to mutually independently control a hydraulic pressure in the distribution line and a hydraulic pressure in the actuation line.

7. A method for the control of the hydraulic pressure in the distribution line and of the hydraulic pressure in the actuation line of the continuously variable transmission according to claim 6, comprising:
   controlling the hydraulic pressure in the distribution line and the hydraulic pressure in the main actuation line to the same level when the switch valve is in a position that provides the hydraulic connection between the main actuation line and the distribution line.

8. The method for the control of the hydraulic pressures according to claim 7, wherein the pressure control system that controls the hydraulic pressure in the distribution line comprises a controllable auxiliary pressure-regulating valve,
   the method further comprising closing the controllable auxiliary pressure-regulating valve when the switch valve is in a position that provides the hydraulic connection between the main actuation line and the distribution line.

* * * * *